United States Patent Office 3,502,431
Patented Mar. 24, 1970

3,502,431
PROCESS AND REACTANTS FOR THE PREPARATION OF AMMONIA AND HYDROCHLORIC ACID FROM AMMONIUM CHLORIDE
Andre Steinmetz, Aubervilliers, France, assignor to Produits Chimiques Pechiney-Saint-Gobain, Paris, France
No Drawing. Filed June 22, 1966, Ser. No. 559,387
Claims priority, application France, July 2, 1965, 23,200
Int. Cl. C01b 7/08, 7/12
U.S. Cl. 23—154        10 Claims This invention relates to a process for the preparation of ammonia and hydrochloric acid from ammonium chloride and to the reactants required to carry out the process. More particularly it relates to a two-stage process in which, firstly, a portion of ammonium chloride is brought into contact with a reaction mass comprising chiefly metallic elements of atomic number 27–29, inclusive, that is, nickel, cobalt and copper, whereby chlorine ion is taken up by the reaction mass and ammonia and hydrogen are liberated, and, secondly, the resulting chlorided reaction mass is reduced by means of a hydrogen-containing gas whereby hydrogen chloride gas is produced and the reaction mass is restored to its original form.

The preparation of ammonia and hydrochloric acid by treating ammonium chloride with magnesia heated to about 300° C. has been described. This fixes the hydrochloric acid of the ammonium chloride and liberates the ammonia which is collected. The resulting magnesium chloride is further heated in a current of steam, which decomposes it, and the liberated hydrochloric acid is recovered as an aqueous solution.

This known process has the disadvantage that it yields hydrochloric acid only as an aqueous solution. Furthermore, to liberate the hydrochloric acid it is necessary to heat the magnesium chloride to a high temperature which may reach 800° C. In addition, in carrying out the process it is difficult to recover all the ammonia from the ammonium chloride subjected to the reaction owing to the fact that the hydrochloric acid begins to come off before the ammonia is entirely liberated.

Accordingly, it is an object of the present invention to provide for the preparation of ammonia and hydrochloric acid from ammonium chloride under conditions that are particularly advantageous for industrial operation.

Other objects and advantages will be apparent to those skilled in the art from the present disclosure.

According to this invention ammonia and hydrochloric acid are prepared from ammonium chloride by a cyclic process that comprises essentially two steps: in the first step ammonium chloride is brought into contact with a reactive mass comprising essentially metallic elements having atomic numbers 27–29, inclusive, that is nickel, cobalt, and copper, to fix the chlorine ion on the reactive mass and liberate ammonia and hydrogen; in the second step the resulting chlorided reaction mass is reduced by means of a hydrogen-containing gas, whereby gaseous hydrochloric acid is liberated and the reduced reaction mass is in condition to be used in a further reaction cycle according to this invention.

Preferably one employs a reactive mass comprising essentially copper, cobalt, and nickel, taken individually or in admixture, to which are advantageously added one or more alkali metal chlorides or alkaline earth metal chlorides which have the particular effect of facilitating the release ammonia. Of the alkali metal chlorides the use of potassium chloride is preferred, which may be accompanied by sodium chloride, the molecular ratio of the alkali metal chlorides to the copper, nickel, and cobalt being preferably within the limits 0.30 and 0.65.

It is equally possible to include in the composition of the reactive mass solid substances which are inert under the reaction conditions of the process and which serve as diluents or support of the reactants. These substances, preferably porous, may be, for example, silica gel, fine silica, pummice, calcined alumina, or granular or fibrous asbestos. In particular form, the dimensions of the particles are, for example, between 5 and 100 microns.

Particularly favorable conditions for carrying out the process of the invention involve the use of reactive masses having a base of metallic copper. It is further advantageous to associate with the copper a small amount of nickel, preferably between 6 and 8 percent of the weight of the copper, applicant having determined that this addition has for its principal result a sensible increase in the yield of ammonia.

The reactive masses of this invention can be prepared in various ways. It is, for example, possible simply to mix the constituents of the reactive mas such as metallic copper in powdered form, potassium chloride and calcined alumina. To obtain a homogeneous distribution of the active constituents of the reactive mass, it is, however, preferable to prepare them from the oxides or salts of the metals, such as the chlorides of copper, nickel, and cobalt, which are reduced to the metallic state after admixture with the other constituents. Thus one can mix calcined alumina, copper chloride and potassium chloride, all in powdered form, and treat the mixture with hydrogen in the neighborhood of 500°–550° C. to reduce at least part of the copper chloride to metallic copper. It is equally possible to impregnate support particles with a solution of metal chlorides, such as a solution of copper chloride in hydrochloric acid, add potassium chloride to the resulting mass, and, after drying, treat it with hydrogen as described above.

The reactive masses thus prepared are employed in the process of this invention in any appropriate physical form, advantageously in the form of a powder or granules.

In the first step of the process of this invention, the reactive mass is brought into contact with ammonium chloride, preferably in quantities such that the ratio of the number of molecules of ammonium chloride to that of the metal atoms, such as copper, nickel and cobalt, in the reactive mass is between 30 and 60 percent. This contacting of ammonium chloride with the reactive mass may be effected in different ways. One may, for example, simply mix solid ammonium chloride with the reactive mass, preferably in the absence of air. One may equally well bring the hot reactive mass produced in a previous cycle into contact with ammonium chloride either solid or previously more or less totally sublimed; the ammonium chloride then may be partially or wholly dissociated into a mixture of gaseous hydrochloric acid and ammonia. In operating by this latter method, the attainment of thermal equilibrium in the reaction cycle is facilitated, the prior sublimation of the ammonium chloride permitting the adjustment of the temperature of the reaction medium to a desired value.

In the course of the first step, the reaction mass is maintained at a favorable temperature between 400° and 450° C. preferably between 430° and 440° C. The chlorine ions of the ammonium chloride then become fixed on the reaction mass, and the ammonia and hydrogen liberated are collected in practically stoichiometric amounts with respect to the ammonium chloride used. It is advantageous in this step to entrain the liberated ammonia and hydrogen in a current of gas, inert under the reaction conditions, such as nitrogen or, more favorably, a gentle current of hydrogen.

In the second step of the process, the chlorided reaction mass is treated with a reducing gas, preferably hydrogen, so as to liberate the chlorine ions fixed on the reaction mass in the form of hydrochloric acid. This is accomplished at a favorable temperature between 500° and 550° C., preferably in the neighborhood of 530–540° C. It is advantageous to entrain the liberated hydrochloric acid by means of an excess of hydrogen; the hydrogen liberated in the first step of the process can be recycled in this second step. The recycled hydrogen is first separated from its ammonia content by any known method, for example by absorption in water. In this second step a near quantitative recovery of anhydrous hydrochloric acid is effected based on the ammonium chloride used. If the ultimate use of the hydrochloric acid requires, it is separated from the accompanying hydrogen, as by absorption in a selective solvent such as ethyl glycol. The hydrochloric acid absorbed by the glycol is then liberated by degasification under diminished pressure or raised temperature.

After removal of the hydrochloric acid, the metallic elements of the reactive mass, such as copper, nickel, and cobalt, are again in the metallic state, and the reactive mass, thus regenerated can be used with a new quantity of ammonium chloride in a further reaction cycle according to the invention.

When a reactive mass is used for the first time, it is possible to reduce the chlorides of the metals such as copper, nickel, and cobalt incompletely and thus to retain in the reaction mass a portion of these metals of the order of several percent in the form of chlorides. In succeeding operations, the chlorided mass is reduced by hydrogen until a quantity of hydrochloric acid is released corresponding molecularly to the ammonium chloride used.

When a reactive mass is used for the first time, the reaction cycle is started at the appropriate stage according to the composition of the new reaction mass. Thus when a new reaction mass is used in which the metals such as copper, nickel, and cobalt are principally in the elemental state, the cycle is started with the first step described above which comprises bringing the reactive mass in contact with ammonium chloride. If, on the other hand, the operation is started with a new reaction mass in which the metals such as copper, nickel and cobalt are present as chlorides, the reaction cycle is started at the second stage described above, which comprises reducing the reaction mass with hydrogen.

The process of this invention has several advantages over known methods. It permits the preparation of ammonia and hydrochloric acid from ammonium chloride in practically stoichiometric yields, the hydrochloric acid thus produced being in an anhydrous form. Also the speeds of liberation of ammonia and hydrochloric acid are great, the operations are easy to carry out, and the ammonia is quantitatively liberated before the hydrochloric acid begins to evolve.

In order to illustrate the process of the invention but without limiting its scope, which is defined in the accompanying claims, the following four examples are presented:

EXAMPLE 1

A reactive mass is prepared by admixing 100 g. alumina previously calcined at 800° C., the alumina being in particulate form having particle dimensions of 40 to 100 microns, with 74.85 g. cuprous chloride CuCl, 3.75 g. nickel chloride $NiCl_2$, 13 g. potassium chloride KCl, and 9.5 g. sodium chloride NaCl.

This reactive mass is reduced in a current of hydrogen at 15 l. per hour at a temperature of 540°–550° C. and the evolved hydrochloric acid is collected.

Twenty g. ammonium chloride previously sublimed by heat is passed under and through the reduced reactive mass with the aid of a current of hydrogen at 0.5 l. per hour while the reaction mass is maintained at about 430–440° C. The ammonia and the hydrogen liberated by the fixation of the chlorine ion on the reaction mass escape and are collected—in 1 hour and 10 minutes 6.2 g. ammonia corresponding to 97.5 percent of the amount introduced in the form of ammonium chloride.

The temperature of the chlorided reactive mass is then raised to 530°–540° C. and a current of hydrogen at 15 l. per hour is passed through it for 2 hours 15 minutes. The yield is 13.6 g. anhydrous hydrochloric acid which is collected and amounts to substantially the entire amount of hydrochloric acid introduced in the form of ammonium chloride.

The reactive mass is then ready for use in a new operation according to this invention.

EXAMPLE 2

The reactive mass regenerated in the preceding example is recycled with a new charge of 20 g. ammonium chloride. Under the same conditions there are recovered 6.24 g. ammonia, 13.6 g. anhydrous hydrochloric acid—or respectively 98.15 and 100 percent of the ammonia and hydrochloric acid introduced in the form of ammonium chloride.

EXAMPLE 3

A reactive mass is prepared under the same conditions as in Example 1 from 100 g. alumina previously calcined at 800° C., 74.85 g. cuprous chloride, 13 g. potassium chloride and 10 g. sodium chloride.

After treating this reactive mass with hydrogen, it is brought into contact with 20 g. ammonium chloride at about 430°–440° C. In 1 hour 20 minutes, 5.85 g. ammonia is recovered, or 92 percent of the ammonia introduced as ammonium chloride.

The chlorided mass is then treated with hydrogen at about 530°–540° C.; in one hour 9.55 g. and in 2 hours 10 minutes 13.2 g. hydrochloric acid is recovered, corresponding respectively to 70 percent and 96.60 percent of the ammonium chloride used.

EXAMPLE 4

A reactive mass is prepared by admixing 35 g. fine silica, 95 g. cobalt chloride $CoCl_2 \cdot 6H_2O$ (96.8 g. percent pure), 7.45 g. potassium chloride KCl and 5.85 g. sodium chloride. The mass is first dehydrated by heating at about 300° C. for about 30 minutes, then reduced at around 530°–550° C. in a current of hydrogen at 15 l. per hour.

Twenty g. ammonium chloride previously sublimed by heat is introduced under the reduced reactive mass while it is maintained at 430°–440° C. and passed through it by means of a current of hydrogen at 0.5 l. per hour for 1 hour and 25 minutes. The ammonia and hydrogen liberated by the fixation of the ion of chlorine in the ammonium chloride on the reactive mass escape and are collected—6.1 g. ammonia corresponding to 96 percent of the amount introduced in the form of ammonium chloride.

The chlorided reactive mass is then reduced by a current of hydrogen at 15 l. per hour while holding the reacting mass at around 540°–550° C. In 50 minutes of this treatment 10.65 g. and in 1 hour 20 minutes 12.4 g. anhydrous hydrochloric acid is recovered, corresponding respectively to 78 percent and 91 percent of the hydrochloric acid introduced in the form of ammonium chloride.

The so regenerated reactive mass is recycled six times under the preceding conditions. In the course of each of the six recyclings one obtains yields of ammonia and hydrochloric acid sensibly equivalent to those obtained in the first operation.

Advantages of the invention are the production of $NH_3$ and HCl from $NH_4Cl$ efficiently, by a cyclic process in which the liberated HCl appears as an anhydrous gas and the recoveries are almost total. Other advantages are the avoidance of the problems of the processes of the prior art, and the regeneration of the active mass, on the surface of which the reactions occur, during the process.

As many apparently widely different embodiments of the present invention may be made without departing from the spirit and scope thereof, it is to be understood that

What is claimed is:

1. A two-step process for the production of ammonia and hydrochloric acid from ammonium chloride, comprising as a first step, bringing ammonium chloride into reactive contact with a reactive mass comprising an element selected from the group consisting of Cu, Ni and Co, whereby the metal is converted to a chloride by reaction with the chlorine liberated from the ammonium chloride, and ammonia and hydrogen are liberated, collecting the ammonia, and as a second step, contacting the chlorided reaction mass with a stream of reducing gas, to re-convert the metal chloride thereof to the metallic state and hydrochloric acid is released, and collecting the hydrochloric acid.

2. The process of claim 1 in which the first step is carried out at a temperature in the range 400°–450° C. and the second step is carried out at a temperature in the range 500°–550° C.

3. The process of claim 1, the molecular ratio $NH_4Cl/Me$ is between 0.3 and 0.6, Me being Cu, Ni or Co.

4. The process of claim 1 in which the reaction mass comprises principally copper.

5. The process of claim 1 in which the reaction mass comprises a major amount of copper and a minor amount of nickel.

6. The process of claim 1 in which the reaction mass contains cobalt.

7. The process of claim 1 in which the reaction mass contains potassium chloride.

8. The process of claim 7, the molecular ratio $KCl/Me$ being between 0.3 and 0.65, Me being Cu, Ni or Co.

9. The process of claim 7, in which the mass contains a minor amount of sodium chloride.

10. A cyclic process for the production of ammonia and hydrochloric acid which comprises carrying out the two steps of claim 1 in a first cycle, utilizing the reduced reaction mass obtained at the end of the second step of the first cycle as the reaction mass in the first step in the second cycle, and continuing the cycling.

References Cited

UNITED STATES PATENTS

| | | | |
|---|---|---|---|
| 1,718,420 | 6/1929 | Kessler | 23—154 |
| 2,271,056 | 1/1942 | Balcar | 23—219 |
| 2,735,749 | 2/1956 | Prutton et al. | 23—193 XR |
| 2,787,524 | 2/1957 | Claflin | 23—154 |
| 3,135,584 | 6/1964 | Brooks et al. | 23—219 |
| 3,342,557 | 9/1967 | Metaizeau | 23—219 |

OTHER REFERENCES

J. W. Mellor's: "A Comprehensive Treatise on Inorganic and Theoretical Chemistry," vol. III, 1923 ed., pages 160, 177 and 178, Longmans, Green & Co., N.Y., publishers.

EDWARD STERN, Primary Examiner

U.S. Cl. X.R.

23—87, 97, 193, 212, 219; 252—182